J. KENT.
PRODUCTION OF BORES IN GLASS.
APPLICATION FILED APR. 1, 1920.
1,382,650.
Patented June 28, 1921.
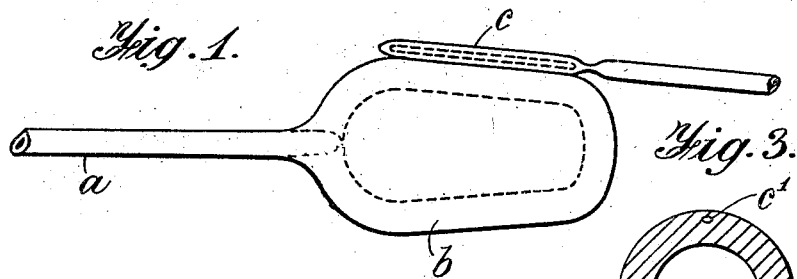
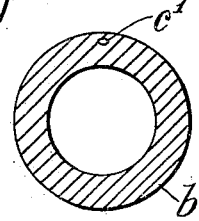
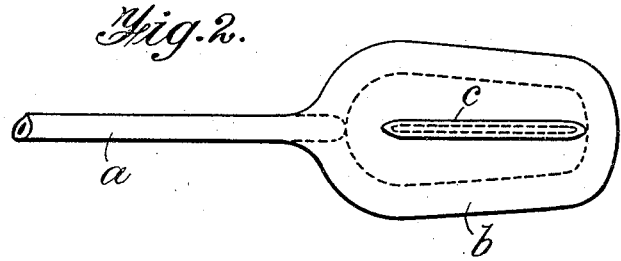
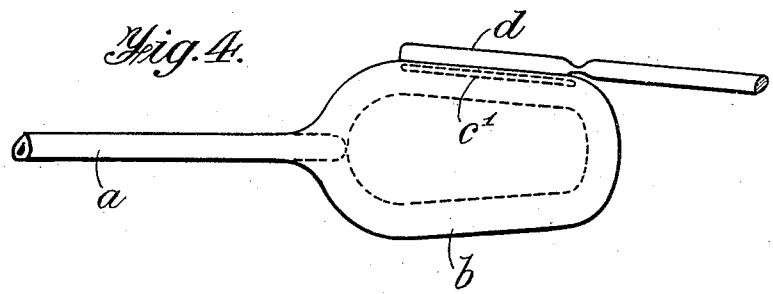
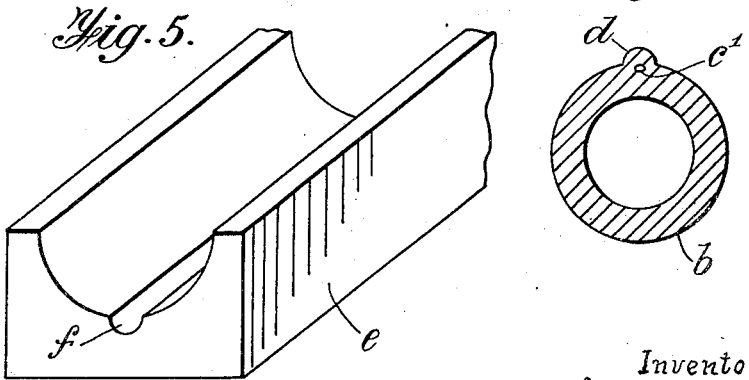
Inventor
Joseph Kent
M. H. Lockwood
Attorney.

UNITED STATES PATENT OFFICE.

JOSEPH KENT, OF MALDON, ENGLAND.

PRODUCTION OF BORES IN GLASS.

1,382,650.

Specification of Letters Patent.  Patented June 28, 1921.

Application filed April 1, 1920. Serial No. 370,545.

*To all whom it may concern:*

Be it known that I, JOSEPH KENT, of The Downs, Maldon, in the county of Essex, England, glass-tubing manufacturer, have invented certain new and useful Improvements in or Relating to the Production of Bores in Glass, of which the following is a specification.

This invention relates to the production of bores in glass, and has for its primary object to enable a bore to be produced in glass during the process of manufacture, without having recourse to the operation of blowing.

According to the invention, a sealed length of glass tubing is applied in a heated state to, so as to become autogenously united with, the mass of glass in which a bore is to be produced, while such mass is in the plastic condition, and thereupon the "piece" thus constituted is so manipulated as to cause said sealed length of tubing to become incorporated with the mass and to cause the piece to assume the desired cross-sectional configuration wherein the bore, due to the presence of the sealed length of tubing, is presented in the desired position relatively to the outer periphery of the piece. In the event of its being thereafter required (as in the manufacture of glass tubing) to reduce the cross-sectional dimensions of the piece, the latter is reheated and drawn out to the necessary extent.

If a lens front is to be provided for the bore, a length of previously-molded glass rod of the requisite lenticular cross-section is so applied to, and bedded-down in position upon, the surface of the piece while both are hot, as to become autogenously united therewith immediately over the bore formed by the incorporation of the sealed length of tubing, after the necessary preliminary stages of manufacture have been carried out but before the piece is drawn down to the cross-sectional dimensions required in the finished product.

It is preferable, as a rule, that the sealed length of glass tubing, which is to be employed as above stated, should have been previously exhausted; but it may in some cases contain a gas.

Spirit-bore (or other suitable small-bore) tubing may be employed for the purpose, and, may be prepared by first exhausting from it the air (as by the means commonly in use for exhausting the bulbs of electric incandescent lamps), and then sealing-off suitable lengths, which are placed in such proximity to the glass furnace as to become and remain sufficiently heated, in readiness for being taken up and applied in the manner stated.

The mass of glass with which the sealed length of tubing is to be incorporated may be solid, or it may have had blown in it a cavity adapted to form, when the piece is drawn out, another bore; in which latter case the invention offers the great advantage of rendering commercially practicable the manufacture of glass tubing having more than one bore. Heretofore, in the production of what may be called twin-bore glass tubing, the practice has been to employ for each bore a separate ball of glass, blown on an independent blowing-iron; but the difficulties incidental to manipulating the irons after the respectively-attached balls have been united and both before and after the resulting "piece" has reached the drawing-out stage, have proved commercially prohibitive. By the present invention these difficulties are overcome in consequence of the improved method of production rendering it unnecessary to employ more than a single blowing-iron.

The invention will be described with reference to the accompanying drawings, wherein Figures 1 to 3 illustrate the manufacture of "cylinder" tubing having a capillary bore in the thickness of its wall, while Figs. 4 to 6 illustrate the manufacture of similar but lens-fronted tubing.

Fig. 1 is a side elevation of an approximately-cylindrical blown "ball" of glass with a sealed length of exhausted tubing in process of being applied to it to form what may be termed a composite "piece"; Fig. 2 illustrates the same stage of the operation, the composite piece being shown as turned about its axis through an angle of about 90 degrees from the position shown in Fig. 1; and Fig. 3 is a cross-section of the piece immediately before being drawn-out, shown to a larger scale, Fig. 4 is a side elevation of a "piece" having a sealed length of exhausted tubing embedded in the thickness of its approximately cylindrical wall, with a length of glass rod of lenticular cross-section in process of being applied to it immediately over the bore formed by the incorporation of the exhausted tubing; Fig. 5 is a perspective end view of a mold for use in bedding-down such lenticular glass rod in position on the piece; and Fig. 6 is a cross-section of the lens-fronted piece immediately before being drawn-out, shown to a larger scale.

Similar reference symbols denote corresponding parts throughout the drawings.

In the manufacture of "cylinder" tubing having a capillary bore in the thickness of its wall, for use in constructing clinical thermometers with insulated scales but without a lens-front, the necessary quantity of "metal" is gathered on a blowing-iron $a$ (Fig. 1), and the "ball" $b$ is blown and marvered so as to be brought to the approximately cylindrical shape indicated in Fig. 1. A sealed length $c$ of exhausted spirit-bore tubing, previously prepared and suitably heated, is then applied to the blown ball $b$ so as to become autogenously united or incorporated therewith; the length of tubing $c$ extending in an axial plane of the ball $b$ and throughout substantially its entire length, as indicated in Fig. 2. The blowing and marvering of the composite "piece" thus formed are then finished so as to cause the bore $c^1$ formed by the incorporation of the spirit-bore tubing $c$ to be presented in the thickness of the wall of the ball $b$, and, after the piece has been covered (by dipping in the molten metal in the pot) and marvered so as to bring it to a cylindrical shape presenting in cross-section the appearance indicated in Fig. 3, the piece is reheated and drawn-out to the required cross-sectional dimensions. In Fig. 3, $b$ is the wall of the cylindrical ball or piece, which is of relatively large diameter, and $c^1$ is the relatively small bore produced as described in the thickness of the wall.

The necessary cross-sectional dimensions of the cylindrical ball or piece and of the spirit-bore (or other small-bore) tubing, for giving any required ratio between the diameters of the cylinder-bore and capillary bore when the piece is drawn out, can be readily determined by experiment, and when such dimensions are known, the production of any kind of twin-bore tubing becomes a matter of routine.

In the manufacture of lens-fronted "cylinder" tubing having a capillary bore in the thickness of its wall, for use in constructing lens-fronted clinical thermometers with insulated scales, the method described above with reference to Figs. 1 to 3 is followed substantially so far as regards the process of incorporating the sealed length of exhausted spirit-bore (or other small-bore) tubing with the approximately cylindrical ball or piece $b$; the piece being marvered and blown so as to give the requisite flatness to the spirit-bore tube and cause it to become embedded in the wall of the piece, preferably in such manner that the small bore $c^1$ is presented in a position, as indicated in Figs. 4 and 6, somewhat nearer to the outer surface of the piece than was shown in the former example. A length of previously-molded lens-rod $d$ of appropriate (preferably about half-round) cross-section is then lightly dipped in the molten metal in the pot so that its flat lower side becomes just covered with a very thin coating of glass, and is thereupon applied to the surface of the piece immediately over the small bore $c^1$ (see Fig. 4). In order to insure the proper bedding-down of the lens-rod $d$ upon the piece the whole is then laid in a hot mold $e$ (Fig. 5) of approximately half-round trough-like cross-section having a central longitudinal groove $f$ extending along the bottom of the trough for the reception of the lens-rod $d$. When the bedding-down is complete, the piece, which now presents in cross-section the appearance shown in Fig. 6, is removed from the mold $e$, reheated, and without further marvering (which would have the effect of destroying the lens) is drawn-out to the required cross-sectional dimensions.

I claim—

1. The method of manufacturing glass tubing, which consists in incorporating with a mass of glass a sealed length of glass tubing, and thereafter drawing out the piece thus constituted until it is reduced to the required cross-sectional dimensions, substantially as set forth.

2. The method of producing a bore in glass, which consists in applying a sealed length of glass tubing to a mass of glass so as to cause it to become autogenously united therewith, and thereafter manipulating the piece thus constituted so as to cause said sealed length of tubing to become incorporated with the mass and to cause the piece to assume the desired cross-sectional configuration wherein the bore, due to the presence of the sealed length of tubing, is presented in the desired position relatively to the outer periphery of the piece, substantially as set forth.

3. The method of manufacturing glass tubing, which consists in applying a sealed length of glass tubing to a mass of glass so as to cause it to become autogenously united therewith; then manipulating the piece thus constituted so as to cause said sealed length of tubing to become incorporated with the mass and to cause the piece to assume the desired cross-sectional configuration wherein the bore, due to the presence of the sealed length of tubing, is presented in the desired position relatively to the outer periphery of the piece; and then drawing out the piece until it is reduced to the required cross-sectional dimensions, substantially as set forth.

4. The method of manufacturing, on a single blowing-iron, glass tubing having more than one bore, which consists in first forming a blown ball of glass of approximately cylindrical shape; then autogenously uniting with said ball a sealed length of glass tubing which extends lengthwise of the ball; then manipulating the piece thus constituted so as to bring it to the desired cross-sectional shape; and then drawing out said piece until it is reduced to the required cross-sectional dimensions; substantially as set forth.

5. In the manufacture, by the method claimed in claim 4, of cylinder-bore thermometer-tubing having a capillary bore in the thickness of its wall, uniting with the blown ball of glass of approximately cylindrical shape a sealed length of exhausted glass tubing, having a diameter which is small relatively to that of said ball, and so treating the piece thus formed as to cause the bore of such small diameter tubing to be presented in the thickness of the cylindrical wall of said piece, substantially as set forth.

6. The method of manufacturing lens-fronted cylinder-bore thermometer-tubing having a capillary bore in the thickness of its wall, which consists in first forming a blown ball of glass of approximately cylindrical shape; then uniting with said ball a sealed length of exhausted glass tubing of relatively small diameter which extends lengthwise of the ball; then treating the piece thus constituted so as to cause the bore, formed by the incorporation of such small-diameter tubing, to be presented in the thickness of the cylindrical wall of said piece; then applying to and bending-down in position upon the surface of the piece immediately over said small-diameter bore a length of previously-molded glass rod of lenticular cross-section; and finally drawing-out the piece to the required dimensions, substantially as set forth.

JOSEPH KENT.